US006176423B1

(12) United States Patent
Egami

(10) Patent No.: US 6,176,423 B1
(45) Date of Patent: Jan. 23, 2001

(54) SHUTTER DEVICE HAVING LINKAGE WHICH LOCKS SHUTTER AS WELL AS OPENS AND CLOSES THE SAME

(75) Inventor: Hiroyuki Egami, Sagamihara (JP)

(73) Assignee: Fujitsu Limited, Kawasaki (JP)

( * ) Notice: Under 35 U.S.C. 154(b), the term of this patent shall be extended for 0 days.

(21) Appl. No.: 09/208,471

(22) Filed: Dec. 10, 1998

(30) Foreign Application Priority Data

Jan. 28, 1998 (JP) ................................................ 10-015678

(51) Int. Cl.[7] ...................................................... G06F 17/60
(52) U.S. Cl. ............................................... 235/379; 902/30
(58) Field of Search .................................... 235/379, 380, 235/382; 902/30, 31

(56) References Cited

U.S. PATENT DOCUMENTS 4,733,765 * 3/1988 Watanabe ............................. 235/379
5,593,149 * 1/1997 Kimura et al. ....................... 235/379
5,721,420 * 2/1998 May .................................... 235/379
5,740,744 * 4/1998 Nashirozawa et al. ............. 235/379

* cited by examiner

*Primary Examiner*—Thien M. Le
*Assistant Examiner*—Daniel St. Cyr
(74) *Attorney, Agent, or Firm*—Staas & Halsey LLP

(57) ABSTRACT

The present invention provides an inexpensive, power-saving, and space-saving shutter device that may simplify the mechanism, multifunction each component, and reduce the number of components in comparison with the conventional shutter device. One linkage serves to open and close a shutter, as well as lock the shutter at the closing position. The number of components is reduced in comparison with the conventional structure which provides a plurality of separate devices for such opening, closing, and locking. In addition, the number of driving devices becomes reduced down to one, thereby saving power.

15 Claims, 8 Drawing Sheets

SHUTTER DEVICE HAVING LINKAGE WHICH LOCKS SHUTTER AS WELL AS OPENS AND CLOSES THE SAME

BACKGROUND OF THE INVENTION

The present invention relates generally to mechanical structures for moving and locking a working member, and more particularly to a shutter device having a linkage that serves to lock a shutter as well as to open and close the shutter.

The shutter device of the present invention is applicable to automatic transaction systems. In particular, the present invention is advantageously applicable to a shutter structure at a pool part connected to a bill dispensing unit (BDU), a bill recycle unit (BRU) or an envelope depository unit (EDU) in an automatic teller machine (ATM), cash dispenser (CD), etc.

Hereupon, the BDUs are those units dedicated to bill withdrawal which dispense the bills corresponding to the amount to be withdrawn when a user enters predetermined transaction information, such as card data, his/her PIN, and the amount to be withdrawn. The BRUs are depositing/withdrawing units which enable a user to not only deposit but also withdraw money through entry of the predetermined transaction information. The BRUs inspect the deposited bills and reuse them. The EDUs are units dedicated to deposit which process the amount to be deposited when a user place bill(s) in an envelope and puts the envelope in the unit with entry of the predetermined transaction information.

The automatic transaction systems (or apparatuses) are those which accept and/or dispense one or more transaction media (such as bills, coins, cards, train tickets, entry tickets, securities, e.g., stock certificates, pari-mutuel tickets, lottery tickets, vouchers, slips, merchandise, diagnosis appointment cards) in accordance with the predetermined transaction information entered by a user. In the instant application, automatic transaction systems therefore broadly cover automatic money loan machines, automatic card issue units, automatic bankbook output machines, etc., and the most typical type is an ATM installed at banks and other financial institutions.

Referring to FIG. 12, shutter device 1 in a conventional ATM includes shutter 10 attached to a front surface of pool part 4 in ATM housing 2; shutter driving belt 18, connected to the shutter 10 by joint 12 and passed around rollers 14, 16, which moves the shutter 10; motor 20 which drives the shutter driving belt 18 via the roller 14; lock driving magnet 22 which locks and unlock the shutter 10 at a close position; and various sensors (e.g., opening sensor 24, closing sensor 26, and lock sensor 28).

The shutter 10 moves from an opening position indicated by the broken line, to a close position, indicated by the full line, and opens the pool part 4 when located at the opening position. In order to secure stable movements, a guide member (not shown) guides the shutter 10. In FIG. 12, the pool part 4 is connected to a BRU 6 and bills are carried between the pool part 4 and the BRU 6 under control of the controller 8 at the printed board (not shown). Of course, this shutter device 1 is applicable to BDUs and EDUs.

A description will now be given of a withdrawal action in an ATM having such a conventional shutter device 1. A user, operating an operational part (i.e., facade) attached to a surface of the ATM housing 2, inserts a card, and enters a PIN and the amount to be withdrawn. When the card is inserted, the controller 8 communicates, based on the information recorded on the card magnetic stripe, with a host computer which administers the card and transmits to the host computer the PIN and the amount to be withdrawn entered by the user. The controller 8 then requests the host computer to check the transaction information, (e.g., if the PIN is correct and if the withdrawal amount is within the allowable limit) and asks for an approval of the transaction.

On the other hand, the controller 8 anticipates the transactional approval from the host computer, and determines the kind and number of bills corresponding to the withdrawal amount, independent of a process in the host computer, so as to shorten the transaction time. The controller 8 then instructs the BRU 6 to carry the kind of money. In response, the BRU 6 feeds the bills to the pool part 4. The carried bills are temporarily pooled at the pool part 4 until all the bills are carried to the pool part 4 and the controller 8 receives the transactional approval from the host computer.

For example, when the user tries to withdraw ¥54,000, the BRU 6 recognizes that five ¥10,000 bills and four ¥1,000 bills based on the instruction from the controller 8. As a result, the BRU 6 first feeds to the pool part 4 five ¥10,000 bills from a ¥10,000 bill storing unit (not show) which stores ¥10,000 bills, and then feeds to the pool part 4 four ¥1,000 bills from a ¥1,000 bill storing unit (not shown) which stores ¥1,000 bills. Optionally, the BRU 6 may feed nine bills one by one to the pool part 4. Alternatively, another pool part may be provided at a front stage of the pool part 4. The BRU 6 may feed all the nine bills to the other pool part, and then all the bills may be fed together to the pool part 4.

In either event, since the shutter 10 should remain closed until all the nine bills are pooled at the pool part 4 and until the host computer responds a transactional approval, the shutter 10 should be fixed (or locked) at the close position. For example, if the shutter 10 is opened when only five bills are pooled at the pool part 4 and the bills are taken out, the bill feeding process would become hindered. On the other hand, even after all the nine bills are pooled at the pool part 4 and thus the feeding operation ends, if the shutter is opened and the bills are taken out during the communication with the host computer, that would cause a theft or loss of the bills if the host computer disapproves the transaction due to an incorrect PIN or any other reason.

Therefore, when the closing sensor 26 detects that the shutter 10 is positioned at the close position, the lock driving magnet 22 moves the lock part 30 from a position indicated by the broken line to a position indicated by the full line as illustrated, locking the shutter 10 at the closing position. In order to prevent loss and theft of money to the utmost, the lock sensor 28 confirms whether locking by the lock part 30 works securely. In this way, when a transaction medium is particularly valuable, such as money, the lock sensor 28 is usually provided in the automatic transaction system to check whether locking normally works.

The lock driving magnet 22 is configured such that it drives the lock part 30 only after the closing sensor 26 detects that the shutter 10 is positioned at the close position.

When all the nine bills are pooled at the pool part 4 and the host computer responds a transactional approval, the controller 8 controls the shutter device 1 whereby the lock driving magnet 22 moves the lock part 30 from the position indicated by the full line to the position indicated by the broken line, unlocking the shutter 10. The lock sensor 28 detects the unlocking. After the lock sensor 28 detects the unlocking, the controller 8 controls the shutter device 1 whereby the shutter 1 starts opening. Thereby, the shutter 10 is moved by motor 20 through the shutter driving belt 18 etc., to the open position indicated by the broken line. The opening sensor 24 detects that the shutter 10 has reached the open position.

When the shutter 10 opens, then the user takes out the ¥54,000 from the pool part 4. When all the bills are taken out from the pool part 4, the shutter 10 is moved again to the close position indicated by the full line and locked there.

Thus, the conventional shutter 1 includes, independently, an opening/closing device (12, 14, 16, 18, 20) and a locking device (22, 30) which locks and unlocks the shutter 10 at the close position. In addition, a driving device (20) for the opening/closing device and a driving device (22) for the locking device are separately and independently provided. Furthermore, the conventional shutter device 1 uses three sensors, such as the opening sensor 24, the closing sensor 26, and the lock sensor 28, so as to detects the open state, the close state, the lock state, and unlock state of the shutter 10, respectively.

The conventional shutter device thus requires the large number of components, secondary power for locking and unlocking, and a relatively large installation space. People have indicated the room for improvement of the shutter 1 for purposes of compactness, power-saving, and reduced cost. In particular, these demands have been increased in the field of automatic transaction systems to which this shutter device 1 is applied.

BRIEF SUMMARY OF THE INVENTION

Accordingly, it is a general object of the present invention to provide a novel and useful shutter device in which the above disadvantages are eliminated.

Another object of the present invention is to provide a space-saving, inexpensive, and power-saving shutter device which reduces the number of components rather than the conventional shutter device by, for example, simplifying its mechanism and making its components to be multifunctional.

In order to achieve the above objects, a first aspect of the shutter device of the present invention is includes a shutter, a driving device, and an opening/closing device, connected to the shutter and the driving device, which moves the shutter between open and close positions while driven by the driving device, and locks and unlocks the shutter at the close position while driven by the driving device.

In this case, the opening/closing device is not limited to utilize mechanical actions to open and close the shutter, but may employ electric, magnetic and other actions. The locking and unlocking of the shutter are not limited to achieved by mechanical actions, but may come from electric, magnetic and other actions.

A second aspect of the shutter device of the present invention includes a shutter, a guide rail arranged to be fixed relative to the shutter, a linkage connected to the shutter and guide rail, and a driving device connected to the linkage, the linkage moving the shutter between open and close positions while driven by the driving device and guided by the guide rail, and the linkage locking and unlocking, while cooperating with the guide rail, the shutter at the close position when the shutter is located at the closing position.

A third aspect of the shutter device of the present invention includes a shutter, a driving device, a driving member driven by the driving device, and an operating member connected to the shutter and the driving member, wherein the operating member moves, while driven by the driving member, the shutter between open and close positions before the shutter is locked, and wherein the operating member restricts the shutter from moving further in a closing direction when the shutter is located at the close position, and locks and unlocks the shutter at the close position by cooperating with the driving member.

A processing system of the present invention includes a working member, a processor, a driving device, and a linkage, connected to the working member and the driving device, which moves the working member between first and second positions while driven by the driving device, and locks and unlocks the working member at the first position while driven by the driving device, wherein the processor conducts a predetermined process when the working member is locked at the first position.

A bill withdrawal method of the present invention includes determining a kind and number of bills corresponding to a withdrawal amount in accordance with entry of transaction information, carrying said bills from a bill storage to a pool part closed by a shutter, and storing the bills in the pool part, opening the shutter, confirming that the bills are taken from the pool part, and closing the shutter, wherein the step of opening the shutter includes a step of driving a driving device thereby continuously conducting unlocking of the shutter at a close position and moving of the shutter from the close position to an open position after the unlocking, via a linkage driven by the driving device, the linkage being able to move the shutter between the open position and the close position, and lock and unlock the shutter at the close position, and wherein the step of close the shutter includes a step of driving the driving device thereby continuously conducting moving of the shutter from the open position to the close position and locking of the shutter at the closing position after the moving, via the linkage.

According to the first aspect of the present invention, the opening/closing device opens and closes the shutter, and locks and unlocks the shutter at the close position while driven by one driving device. According to the second aspect of the present invention, the linkage opens and closes the shutter, cooperating with a guide rail, and locks and unlocks the shutter at the close position. According to the third aspect of the present invention, the driving member drives the operating member to move the shutter, and the driving member and the operating member cooperatively lock and unlock the shutter when the shutter is positioned at the close position. According to the processing system of the present invention, the linkage serves to move and lock the working member, and the driving device serves both as a driver for moving the working member and a driver for locking the working member. The bill withdrawing method of the present invention may continuously open, close, lock and unlock the shutter by driving only one driving device in the opening and closing operations of the shutter.

Other objects and further features of the present invention will become readily apparent from the following description and accompanying drawings.

DETAILED DESCRIPTION OF PREFERRED EMBODIMENTS

Figure 1:
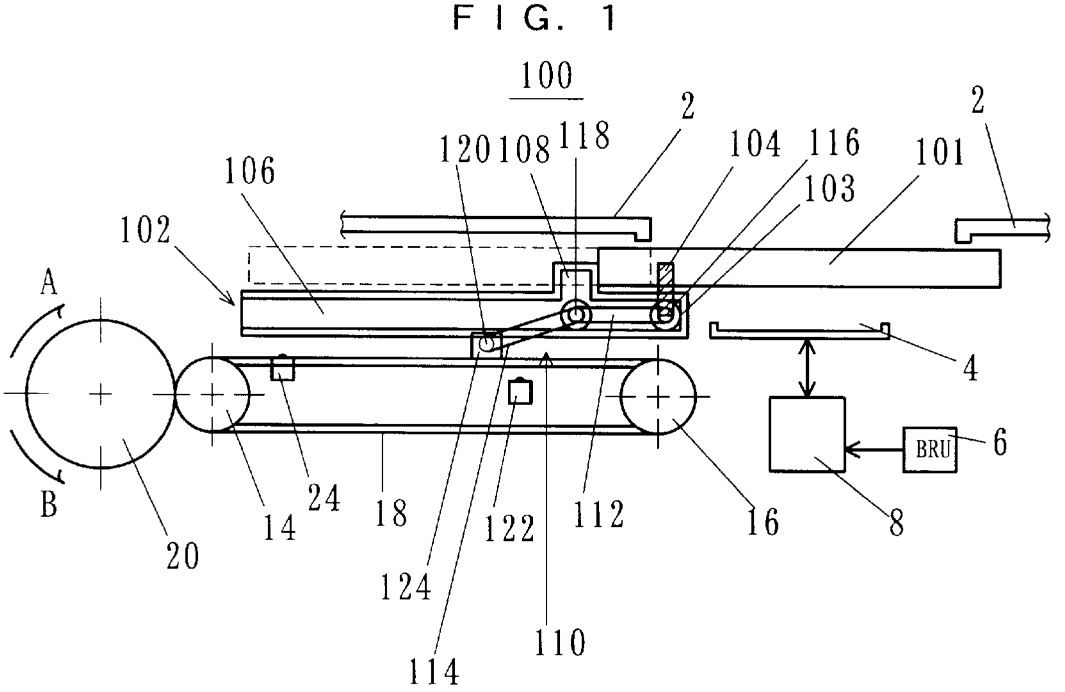
FIG. 1 is a sectional view of an essential part for explaining a principle of a shutter device of the present invention, which illustrates a shutter which has reached a close position but not been locked yet.

Referring to the accompanying drawings, a description will be given of a shutter device of the present invention and the ATM having it. In each figure, those elements which are the same as corresponding elements in FIG. 12 are designated by the same reference numerals, and a duplicate description thereof will be omitted.

Figure 2:
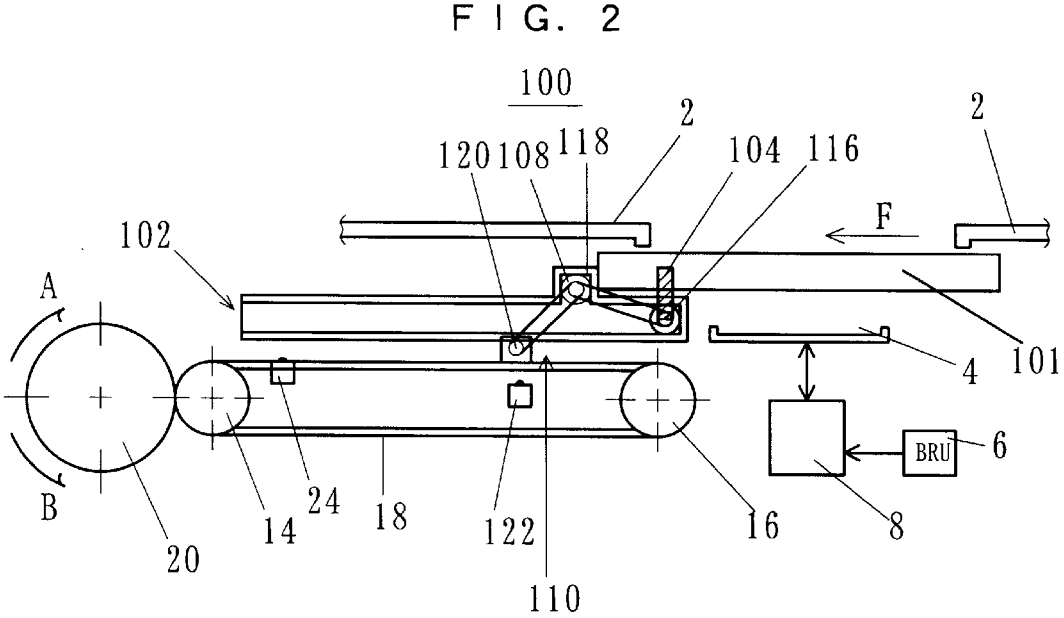
FIG. 2 is a sectional view of an essential part for explaining the principle of the shutter device of the present invention, which illustrates the shutter locked at the close position.

FIGS. 1 and 2 each are a sectional view of a principle part which illustrates a principle of the shutter device 100 to which the present invention is applied.

Figure 12:
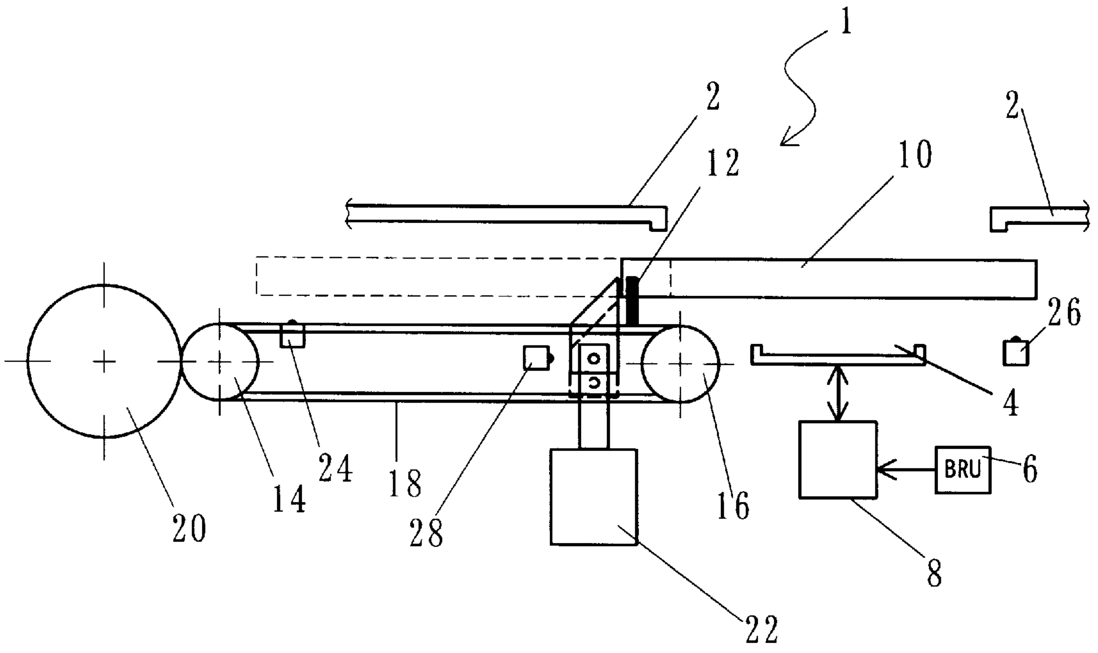
FIG. 12 PRIOR ART
FIG. 12 is a sectional view of an essential part for explaining a principle of a prior art shutter device.

The shutter device 100 of the present invention includes, in addition to the rollers 14, 16, the shutter driving belt 18, the motor 20 and the opening sensor 24 shown in FIG. 12, shutter 101 provided at a front surface of the pool part 4 inside the ATM housing 2; guide rail 102 fixed relative to the shutter 101; linkage 110 connected to the shutter 101, the guide rail 102, and the shutter driving belt 9; and lock sensor 122.

Although the rollers 14, 16, the shutter driving belt 18, the motor 20 are the same as those shown in FIG. 12, they are functionally integrated. According to the present invention, one driving device supplies power for opening, closing, locking and unlocking the shutter 101. Therefore, in comparison with the conventional shutter device 1 shown in FIG. 12 in which the driving device (20) for opening and closing the shutter 10 and the driving device (22) for locking and unlocking the shutter 10 are independently and separately provided, the mechanism is simplified.

The shutter 101 may move between the open position indicated by the broken line and the close position indicated by the full line in FIG. 1, and is connected to operating shaft 116 of the linkage 110 via joint 104. The shutter 101 and the joint 104 may or may not rotate relative to each other.

The joint 104 may use any structure as far as it connects the shutter 101 to the operating shaft 116 of the linkage 110. In FIGS. 1 and 2, the shutter 101 and the operating shaft 116 are spaced at different heights from each other, but may be level with each other. Alternatively, the joint 104 may be omitted and the operating shaft 116 may be directly perforated through the shutter 101. The shutter 101 is not limited to a plate shaft that moves linearly, but the present invention is not prevented from being applied to shutters which move in three dimensions and/or which have a shape other than a plate shape.

The guide rail 102 serves to guide movements of the operating shaft 116 (and lock shaft 118) of the linkage 110, and to lock the shutter 101 through engagement with the lock shaft 118. Therefore, the guide rail 102 shown in FIGS. 1 and 2 directly guides movements of the linkage 110, not movements of the shutter 101. In FIGS. 1 and 2, it is a guide member (not shown) that directly guides movements of the shutter 101.

The guide rail 102 is a plastic rail member having a thin width, and fixed inside the ATM housing 2. The guide rail 102 includes guide groove 106 in a longitudinal direction thereof parallel to a moving direction of the shutter 101; and retreat groove 108 which locks the shutter 101 at the close position through engagement with the lock shaft 118.

The operating shaft 116 and the lock shaft 118 get into the guide groove 106. In FIGS. 1 and 2, the guide rail 102 is positioned sectionally under the shutter 101, but is not limited to this position. For example, when the operating shaft 116 is directly inserted into the shutter 101, it is sectionally level with the shutter 101.

The shape of the guide groove 106 of the guide rail 102 changes depending upon a movement path of the shutter 101. For example, if the shutter 101 moves three-dimensionally, the guide groove 106 has a curvilinear shape, for example.

Similarly, the shape of the retreat groove 108 of the guide rail 102 is not limited to the illustrated rectangular shape as far as it may lock the shutter 101 at the close position through engagement with the lock shaft 118, and changes depending upon shapes of the guide groove 106 and the lock shaft 118.

The guide rail 102 is configured as an independent member in FIGS. 1 and 2, but replaceable with a guide groove or the like which is formed by processing a wall surface of the housing which accommodates the shutter device 100. The guide rail 102 may guide the shutter 101 and the operating shaft 116 of the linkage 110 together. The guide rail 102 may be configured as one rail shape.

The linkage 110 includes link 112 which connects the operating shaft 116 and the lock shaft 118 to each other, and link 114 which connects the lock shaft 118 and the driving shaft 120 to each other. The link 112 is rotatable around the operating shaft 116 and the lock shaft 118, whereas the link 114 is rotatable around the lock shaft 118 and the driving shaft 120. Although FIGS. 1 and 2 indicate that the operating shaft 116, the lock shaft 118, the driving shaft 120 each have a circular section, but they may have other shaped sections.

The operating shaft 116 moves the shutter 101 between the open and close positions, and locks and unlocks the shutter 101 while cooperating with the driving shaft 120, when the shutter 101 is located at the close position.

More specifically, the operating shaft 116 moves, while inserted into the guide rail 102, driven by the driving shaft 120, and guided by the guide groove 106, the shutter 101 between the open position and close position via the joint 104. The operating shaft 116 contacts end 103 of the guide rail 102 when the shutter 101 is located at the close position. Such a contact restricts the operating shaft 116 from moving in a direction for moving the shutter 101 (i.e., a right direction in FIG. 1), thereby locking the shutter 101 in the right direction. Then, the operating shaft 116 cooperates with the driving shaft 120 which is moving in the right direction, and displaces the links 112, 114, thereby locking the shutter 101 at the close position via the lock shaft 118.

The operating shaft 116 is connected to the shutter 101 via the joint 104. The joint 104 may or may not rotate around the operating shaft 116.

The lock shaft 118 serves to transmit a driving force from the driving shaft 120 to the operating shaft 116 via the link 112, helping the shutter movement, and lock the shutter 101 at the close position by getting into the retreat groove 108 of the guide rail 102.

Referring to FIGS. 1 and 2, the lock shaft 118 is inserted into the guide rail 102, and moves along the guide groove 106, but it is not indispensable that the lock shaft 118 is inserted into the guide rail 102.

The driving shaft 120 serves to move the operating shaft 116 via the links 112, 114 while driven by the motor 20, and displace the links 112, 114 while cooperating with the operating shaft 116.

The driving shaft 120 is connected to the shutter driving belt 18 via the joint 124. The joint 124 may adopt any structure as far as it moves together with the shutter driving belt 18.

As shown in FIG. 1, the driving shaft 120 is located lower than the operating shaft 116. In other words, the driving shaft 120 is not arranged in line with but spaced from the operating shaft 116 (and the lock shaft 118) in a direction parallel to an opening/closing direction of the shutter 101 (in this case the longitudinal direction of the guide groove 106). This is because if the driving shaft 120 is inserted into the guide groove 106 and these three shafts are level with each other, the force applied by the driving shaft 120 to the lock shaft 118 becomes a horizontal force which makes it difficult to move the lock shaft 118 upwardly and engage the lock shaft 118 with the retreat groove 108.

Of course, it is possible to configure the driving shaft 120 higher than the operating shaft 116, and provide the retreat groove 108 at the lower side of the guide groove 106 so as to engage the lock shaft 118 with it.

For illustrative purposes, FIG. 1 omits a state of the linkage when the shutter 101 is located at the open position. Even when the shutter 101 moves to the open position, the driving shaft 120 is configured such that it does not collide with the roller 7 and the opening sensor 12.

In FIGS. 1 and 2, the linkage 110 includes three shafts (116, 118, 120) and two links (112, 114), but the present invention is not limited to the linkage as configured. Needless to say, the present invention is applicable to a structure which has two shaft and one link or four or more shafts and three or more links. In other words, the linkage may utilize any structure as far as the linkage deforms and locks the shutter after the shutter closes.

Figure 3:
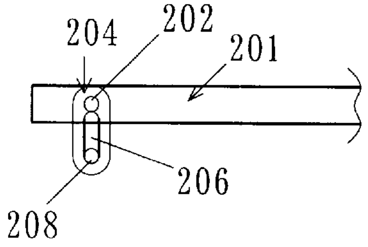
FIG. 3 is a side view of a modification of a joint shown in FIGS. 1 and 2.

For example, if the linkage is comprised of two shafts and one link, the retreat groove of the guide rail is provided in the neighborhood of the operating shaft 116, while the operating shaft 116 is movable to the retreat groove. For example, as shown in FIG. 3, when the joint 104 is replaced with the joint 204, the joint 204 connects shaft 202 of shutter 201 to operating shaft 208, whereby the operating shaft 208 becomes movable in an approximately upper direction along hollow portion 206. Therefore, if the retreat groove is provided in this direction, the operating shaft 208 may get into the retreat groove, locking the shutter 201 by the arrangement with the driving shaft. Of course, the hollow portion 206 may have an arbitrary shape.

FIG. 1 shows a state where the shutter 101 has reached the close position but has not yet been locked. In this state, the operating shaft 116 contacts the end 103 of the guide rail 102. Since the operating shaft 116 cannot move in the right direction, the shutter 101 cannot move in the right direction. However, the lock shaft 118 may move in an approximately upward direction toward the retreat groove 108, so the driving shaft 120 is also movable in the right direction while the lock shaft 118 can move.

FIG. 2 shows a state where the lock shaft 118 gets into the retreat groove 108 of the guide rail 102, consequently locking the shutter 101 at the close position. The state shown in FIG. 2 is achieved by moving the driving shaft 120 in the right direction further than the state in FIG. 1 and displacing the links 112, 114 while cooperating with the operating shaft 116. The state shown in FIG. 2 restricts the lock shaft 118 from moving upwardly by the retreat groove 108, consequently restricting the driving shaft 120 from moving in the right direction.

In the state shown in FIG. 2, the shutter 101 does not open even though a user tries to open the shutter 101 by applying force F in an arrow direction. This is because the force F works in a direction in which the lock shaft 118 is forced against the wall surface of the retreat groove 108, but this will be discussed in detail from an arrangement between the operating shaft 116 and the driving shaft 120.

In locking the shutter 101 at the close position, the driving shaft 120 moves in the right direction from the state shown in FIG. 1 but, since the operating shaft 116 is fixed, these members approach each other relatively. In unlocking the shutter 101, the driving shaft 120 moves in the left direction from the state shown in FIG. 2 but, since the operating shaft 116 does not move, these members relatively separate from each other. In other words, when the shutter 101 is located at the close position, the operating shaft 116 and the driving shaft 120 relatively approach each other in locking the shutter 101, and relatively separate from each other in unlocking the shutter 101. An application of the force F to the shutter 101 in the state in FIG. 2 corresponds to the relative approach between the operating shaft 116 and the driving shaft 120, consequently the shutter 101 remains closed.

In this way, the shutter 101 is securely locked at the close position as a result of engagement between the lock shaft 118 and the retreat groove 108.

Of course, such a linkage is within the gist of the present invention that the operating shaft 116 and the driving shaft 120 relatively separate from each other in locking the shutter 101 at the close position, and relatively approach each other in unlocking the shutter 101, and an application of the force F which attempts to open the shutter 101 relatively separates the operating shaft 116 from the driving shaft 120.

In order to ensure locking, the operating shaft 116 must act for the driving shaft 120 such that it locks the shutter 101 when the force F is applied to open the shutter 101 for the driving shaft 120.

According to the present invention, the linkage 110 as one device opens, closes, locks, and unlocks the shutter 101. Therefore, the mechanism is simpler than that of the conventional shutter device 1 in FIG. 12 which is separately provided with a member which opens and closes the shutter 10 and a member which locks and unlocks it.

It is evident that a device opens, closes, locks and unlocks the shutter is not limited to the linkage 110, and may use any other mechanical structure. Moreover, the present invention is not generally limited to mechanical structures, but includes a device which utilizes electric, magnetic, and any other operations or a hybrid operations among them, as long as it achieves such a multifunction.

According to the present invention, a locking action starts mechanically and continuously just after the shutter 101 moves to the close position. This feature promotes to simplify the mechanism of the shutter device 1 in FIG. 12, particularly by eliminating the closing sensor 26.

In FIG. 12, the closing sensor 26 detects that the shutter 10 that has moved to the close position, and informs this fact as electric information to the lock driving magnet 22. In response, the lock driving magnet 22 moves the lock part 30. Therefore, without the closing sensor 26, the lock driving magnet 22 does not operate even when the shutter 10 moves to the close position in the conventional shutter device 1. Thus, the closing sensor 26 is an indispensable member for starting the lock action of the lock driving magnet 22. The lock driving magnet 22 should be driven only after the has closed sensor 26 detects that the shutter 10 closes; otherwise, the lock part 30 would collide with the shutter 10 or obstruct the movement of the shutter 10.

On the other hand, according to the shutter device 100 of the present invention, when the shutter 101 reaches the close position, the end 103 of the guide rail 102 contacts the operating shaft 116 and secures it in the right direction. It is necessary to insert the lock shaft 108 into the retreat groove 108 so as to lock the shutter 101, and to start this action the links 112, 114 should be displaced in cooperation with the driving shaft 120. In this way, when the shutter 101 moves to the close position, the operating shaft 116 continuously switches from a function to move the shutter 101 to a function to lock and unlock it, serving to eliminate the closing sensor 26.

The shutter device 100 of the present invention detects whether the shutter 101 is locked at the close position through a detection by the lock sensor 122 of a position of the driving shaft 120. As discussed, it is premised that the shutter 101 is located at the close position in order to lock it, so the lock sensor 122 also detects that the shutter 101 is located at the close position.

The ATM to which the present invention is applied does not conduct, for instance, a counting process for withdrawal for security purposes in a state where the shutter 101 closes without being locked (i.e., the state in full line in FIG. 1). Accordingly, the shutter device 100 does not detect this state (shown in full line in FIG. 1), but detects only a state where the shutter 101 is locked at the close position (i.e., the state in full line in FIG. 2).

The lock sensor 122 of the present invention is functionally different from the lock sensor 28 in FIG. 12. The shutter 10 cannot open only after the lock sensor 28 detects unlocking in the shutter device 1 shown in FIG. 12, whereas a detection of unlocking is not indispensable to start the subsequent opening action of the shutter 101 in the shutter device 100 of the present invention. This feature facilitates the processing procedures in the bill withdrawal procedure of the present invention that will be described later.

Various sensors (24, 26, 28, and 122) in FIGS. 1, 2, and 12 are illustrated as sensors that each use a reflection light, but may use any type of sensor, of course. In addition, the opening sensor 12 in FIG. 1 detects, as the opening sensor 24 in FIG. 12, whether the shutter 101 is located at the open position by detecting the shutter 101. However, the opening sensor 24 may detect whether the shutter 101 is located at the open position by detecting the driving shaft 120 in the linkage.

A description will be now given of ATM 400 having the shutter device 100 of the present invention. Initially, the ATM 400 to which the present invention is applied will be schematically described with reference to FIGS. 4 and 5.

Figure 4:
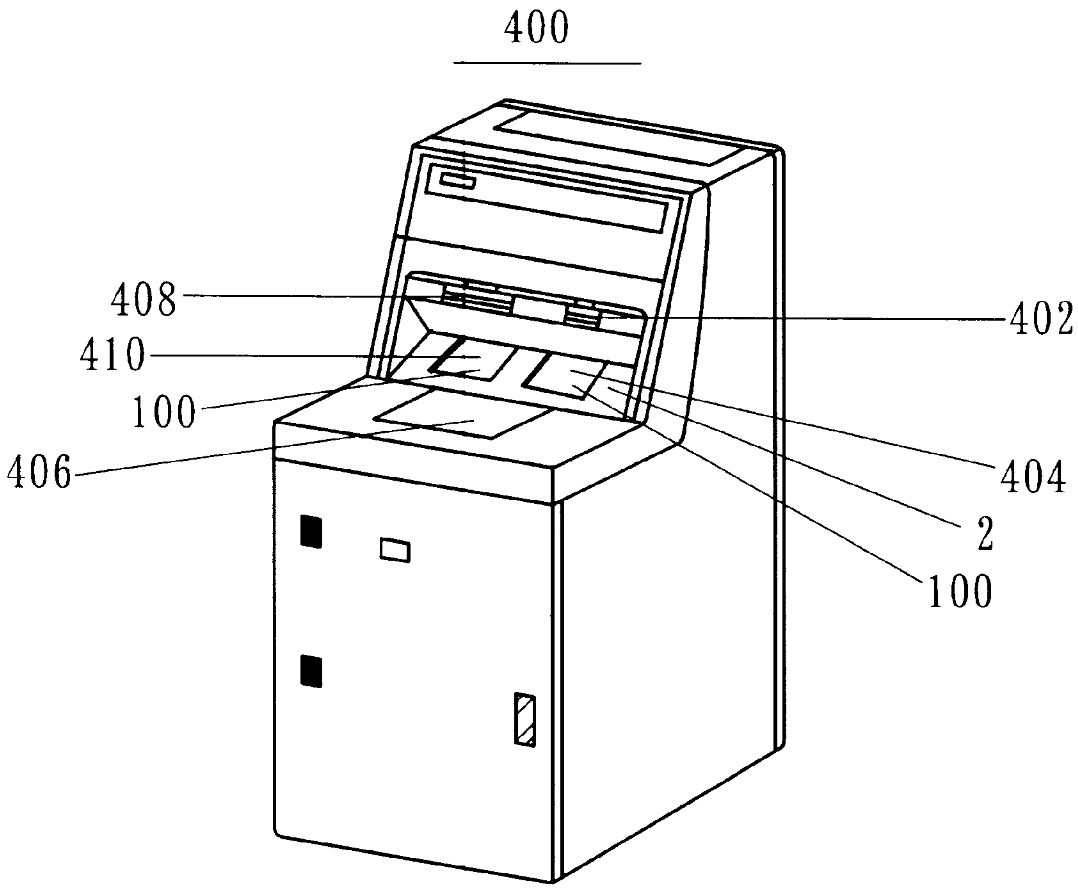
FIG. 4 is a schematic perspective view of an ATM using the shutter device of the present invention.

The ATM 400 shown in FIG. 4 may conduct various transactions including deposit, withdrawal, transferring, registering on a bankbook, indicating of balance information etc, and apparently includes card inlet 402, bill inlet/outlet 404, operating part 406, bankbook inlet 408, and coin inlet/outlet 410 in its housing 2. In the inside thereof, it includes, as shown in FIG. 5, the controller 8, the BRU 6, the shutter device 100, card processing unit 412, registering unit 414, and power source 416 connected to the controller 8.

The card inlet 402 is a place into which a user inserts a card. It is connected to the card processing unit 412 as shown in FIG. 5. The card processing unit 412 includes card reader 422, emboss reader 424, and printing part 426. The card reader 422 reads out the magnetic stripe on the card inserted by the user, and the emboss reader 424 reads out letter/symbol information embossed on the card surface. The printing part 426 prints a transactional result.

The bill inlet/outlet 404 is a place through which a user deposits and withdraws bills, and to which the shutter device 100 of the present invention is applicable. The bill inlet/outlet 404 is connected to the BRU 6 shown in FIG. 5. The BRU 6 includes ¥10,000 bill storing unit (F stacker) 428 which stores ¥10,000 bills and ¥1,000 bill storing unit (R stacker) 430 which stores ¥1,000 bills.

Figure 5:
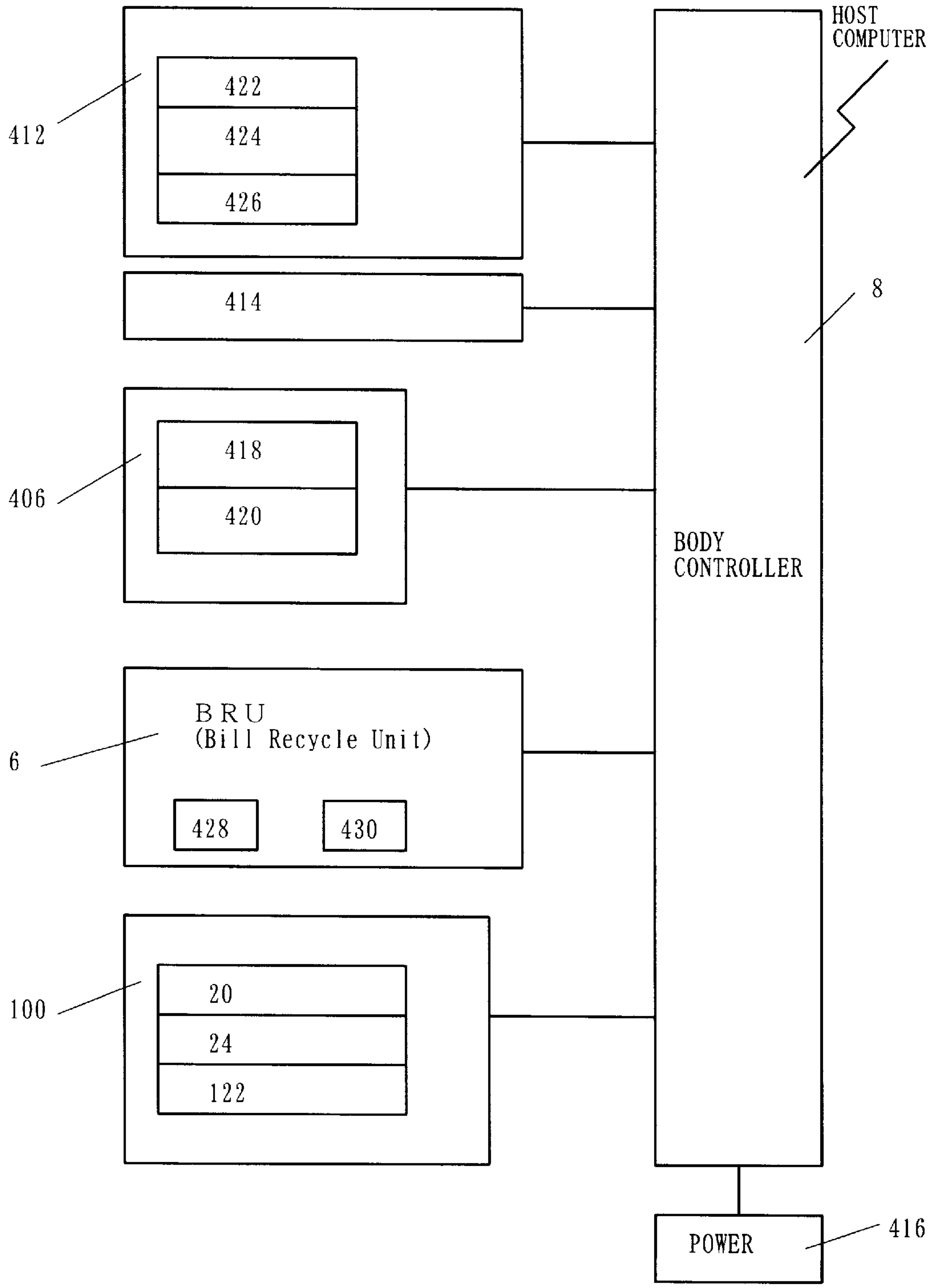
FIG. 5 is a block diagram of the ATM shown in FIG. 4.

As shown in FIG. 5, the controller 8 is connected to the shutter device 100 of the present invention. The controller 8 receives information from the opening and lock sensors 24, 122, and controls driving of the motor 20. Optionally, a separate controller which is controlled by the controller 8 may be provided in the shutter device 100 to control the motor 20, the opening sensor 24, the lock sensor 122 and so on.

The controller 8 may communicate with a host computer in an external financial institution by communication means (not shown), and is turned on and off by main power source 416.

The operating part 406 includes, as shown in FIG. 5, color display 418 having touch keyboard 420. The color display 418 indicates operations and information necessary for transactions. A user performs any desired transaction by operating the touch keyboard 420 and entering necessary information in accordance with the indication.

The bankbook inlet 408 is a place into which a user inserts a bankbook so as to have past transactional history printed. The bankbook inserted through the bankbook inlet 408 is fed to the registering unit 414 shown in FIG. 5.

The coin inlet/outlet 410 is a place through which a user deposits and withdraws coins, and to which the shutter device 100 of the present invention is applicable, similar to the bill inlet/outlet 404. The coin inlet/outlet 410 is connected to the coin storage (not shown). Since the shutter device 100 applied to the coin inlet/outlet 410 is the same as that applied to the bill inlet/outlet 404, the following description refers only to the shutter device 100 which is applied to the bill inlet/outlet 404.

The ATM 400 is illustrated as one of so-called lobby types in FIG. 4, but the shutter device 100 of the present invention is applicable to so-called through-the-wall ATMs, of course. Hereupon, the through-the-wall ATM is defined as an ATM which has a facade (or a front cover) exposing outside the wall through which a user performs various transactional operations and inserts a card, and accommodates the remaining part (or a housing body) inside the wall.

Figure 8:
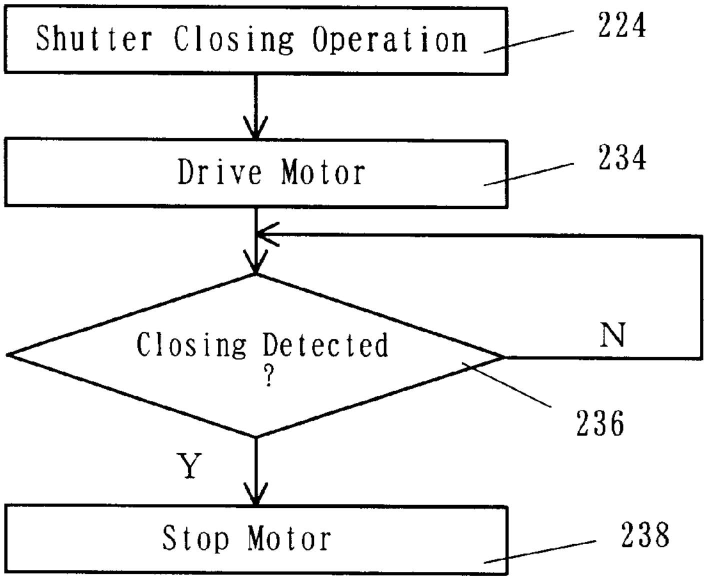
FIG. 8 is a flowchart of a shutter closing action shown in FIG. 6.

A description will now be given of operations of the ATM 400 of the present invention. Since the shutter device 100 of the present invention primarily aims at preventing theft and loss of cash, the instant embodiment only discusses the withdrawal operation of the ATM 400. FIG. 8 shows a procedure of withdrawing bills.

First, a user selects a withdrawal transaction ("withdrawal") from among a plurality of transactional options indicated on the color display 418 in the operating part 406. In response, the color display 418 requests the user to insert a card, and the user inserts in response the card into the card inlet 402 (step 200).

The inserted card is fed to the card processing unit 412 by feeding means such as rollers (not shown), and the card reader 422 reads out information recorded on the magnetic stripe. The card processing unit 412 sends this information to the controller 8, and the controller 8 communicates, based on this information, with a host computer of a financial institution which issued the card (step 202).

When the card is inserted, the color display 418 then requires the user to enter a PIN, and the user enters in response the PIN from the touch keyboard 420 (step 204). Then, the color display 418 requires the user to enter the amount to be withdrawn, and the user enters in response the withdrawal amount from the touch keyboard 420 (step 206). The user who has entered clearly erroneous PIN or the amount exceeding the transactional limit is prompted to reenter them.

The controller 8 receives transactional information of the PIN and the withdrawal amount from the operating part 406, transmits this to the host computer, and requests the host computer to check if it is appropriate and asks for an approval of the transaction. Optionally, the color display 418 prompts the user to insert a bankbook.

When the controller 8 receives the withdrawal amount from the operating part 406, it determines, anticipating the transactional approval, the kind and number of bills corresponding to the withdrawal amount, and instructs, attempting to shorten the transaction time, the BRU 6 to carry the bills. Thereby, if the withdrawal amount that the user desires is ¥4,000, for example, then the BRU 6 recognizes that it should carry five bills from the F stacker 428 and four bills from the R stacker 430, totally nine bills. In accordance with such an instruction, the BRU 6 feeds all the nine bills to the pool part 4 (steps 208, 210).

The carried bills are temporarily stored in the pool part 4. Unless the lock sensor 122 detects unlocking of the shutter 101 before the bills are carried, a step may be provided to terminate the transaction by stopping the procedure.

If the controller 8 receives a response from the host computer that the transaction cannot be approved (step 212), then it informs the fact to the user and terminates the transaction (step 216) if the reason for disapproval is incurable, such as no transaction available with that card (step 214). In this case, the bills which have been pooled at the pool part 4 are returned to the BRU 6.

If the defect is correctable, such as, a wrong PIN (step 214), the color display 418 prompts the user for reentry of the PIN or the withdrawal amount (step 218). The main controller 2 receives the corrected information and requests the host computer to judge the correctness again (step 216). If the correct PIN and/or withdrawal amount are reentered and the host computer provides a transactional approval, the following shutter opening operation begins (step 220).

When the controller 8 receives the transactional approval from the host computer (step 212), it starts opening the shutter 101 (step 220). In the shutter opening operation, the shutter 101 is unlocked and opened continuously.

Figure 6:
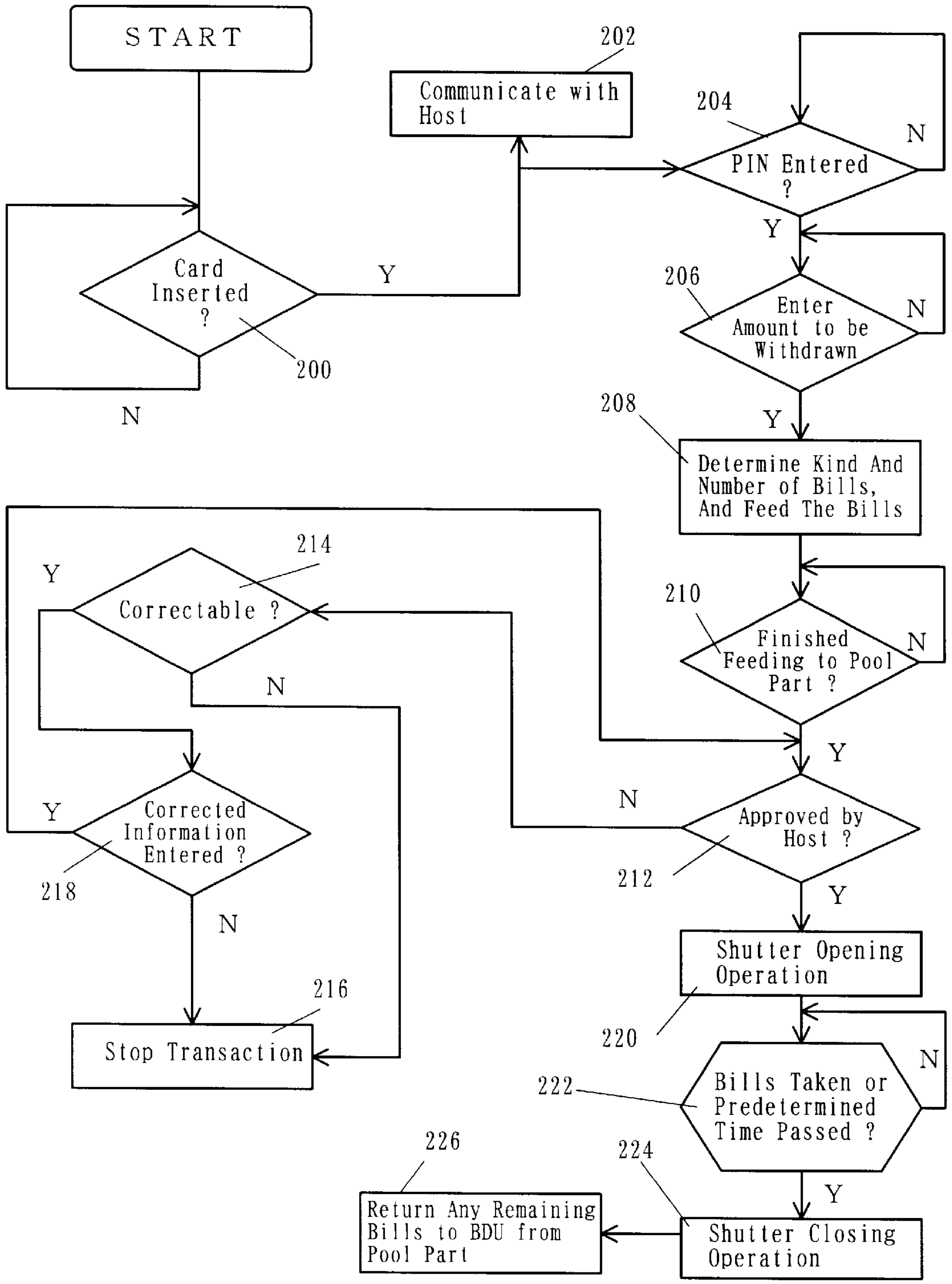
FIG. 6 is a flowchart of a procedure of a withdrawal method according to the present invention.
Figure 7:
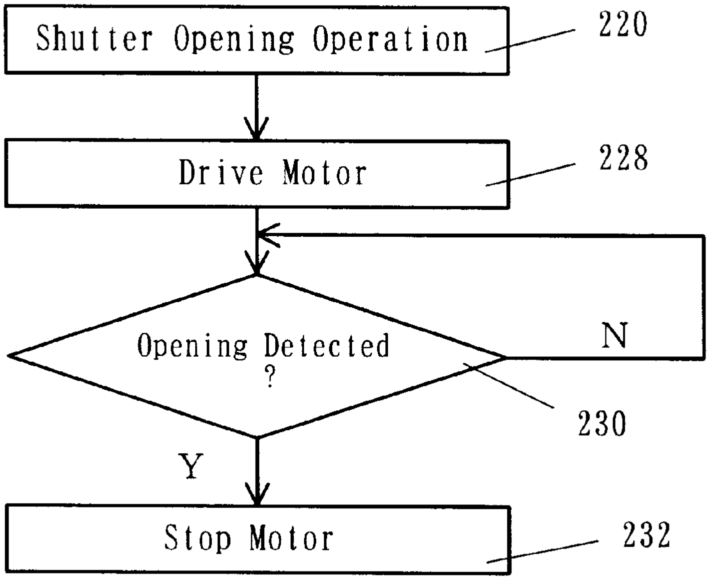
FIG. 7 is a flowchart of a shutter opening action shown in FIG. 6.

FIG. 7 shows details of the step 220 shown in FIG. 6. First, the controller 8 instructs the shutter device 100 to start opening the shutter, thereby driving the motor 20 (step 228). Consequently, the driving shaft 120 is moved in the left direction in FIG. 2 via the roller 14 and the shutter driving belt 18. The lock shaft 118 moves downwardly in FIG. 2 and becomes separated from the retreat groove 108. The linkage 110 transforms to the state shown in FIG. 1, unlocking the shutter 101.

Then, the continuous driving of the motor 20 moves the driving shaft 120 in the left direction shown in FIG. 1. As a result, the link 112 moves in the left direction while guided by the guide groove 116, and the shutter 101 moves to the open position in broken line in FIG. 1. The opening sensor 24 detects whether the shutter 101 moves in the opening direction (step 230). The controller 8 continues to drive the motor 20 until the open sensor 24 detects that the shutter 101 has opened (step 230). When the opening sensor 24 detects the opening of the shutter 101 (step 230), the fact is sent to the controller 8. The controller 8 then instructs the shutter device 100 to stop driving the motor 20, whereby the motor 20 stops being driven (step 232).

In this way, according to the shutter device 100 of the present invention, to unlock and open the shutter 101, only the continuous driving of the motor 20 is needed in a predetermined direction (for example, direction A in FIG. 1). Thus, the procedure becomes simpler than that of the shutter device 1 shown in FIG. 12 in which the lock part 30 is moved downwardly to release locking, the lock sensor 28 confirms the unlocking, and the motor 20 starts opening based on this confirmation.

Now referring back to FIG. 6, if the user has taken out all the bills from the pool part 4 or if the predetermined time has passed while all the bills are not taken out after the shutter 101 opened (step 222), then the shutter 101 starts closing (step 224). Even though all the bills are not taken out from the pool part 4, if the predetermined time has not yet passed, then the shutter 101 remains to open (step 222).

FIG. 8 shows details of the step 224 shown in FIG. 4. First, the controller 8 instructs the shutter device 100 to start closing the shutter, thereby driving the motor 20 (step 234). Consequently, the driving shaft 120 is moved in the right direction in FIG. 1 via the roller 14 and the shutter driving belt 18. The shutter 101 moves from the open position indicated by the broken line to the close position indicated by the full line in FIG. 1. The linkage 110 transforms to the state shown in FIG. 1, unlocking the shutter 101. When the shutter moves to the close position, the operating shaft 116 contacts the end 103 of the guide rail 102, whereby the shutter 101 does not move further in the right direction.

Thereafter, the continuous driving of the motor 20 moves the driving shaft 120 in the right direction shown in FIG. 1. As a result, the lock shaft 118 moves upwardly in FIG. 1 and becomes engaged with the retreat groove 108. At the same time, the shutter 101 is locked, and cannot move further in the right direction. The lock sensor 122 detects the position of the driving shaft 120 in this time, and thereby detects that the shutter 101 is located at the close direction (step 236). The motor 20 is continuously driven until the lock sensor 122 detects that the shutter 101 has closed (step 236). When the lock sensor 122 detects closing of the shutter 101 (step 236), the fact is sent to the controller 8. The controller 8 then instructs the shutter device 100 to stop driving the motor 20, whereby the motor 20 stops being driven (step 238).

In this way, according to the shutter device 100 of the present invention, to close and lock the shutter 101 at the close position, only the continuous driving of the motor 20 is needed in a predetermined direction (for example, direction B in FIG. 1). Thus, the procedure becomes simpler than that of the shutter device 1 shown in FIG. 12 in which the closing sensor 26 confirms that the shutter closes at the close position, the lock driving magnet 22 starts locking the shutter based on this confirmation, and then the lock sensor 28 confirms the locking.

Referring back to FIG. 6, if all the bills are not take out from the pool part 4 within the predetermined time in step 222, the remaining bills are returned to the BRU 6 from the pool part 4 after or at the same time when the shutter 101 closes (step 226).

The printer part 426 prints out this transaction result onto a receipt (transaction statement) and a journal paper with letters etc. embossed on the card surface read out by the emboss reader 424 in the card processing unit 412. The receipt is dispensed with the inserted card through the card inlet 402, awaiting picking up by the user. When the bankbook is inserted from the bankbook inlet 408, the registering unit 414 records the transaction result and balance with the unrecorded past transaction history. The receipt preparation and registration are the same as those conducted in the current ATMs, and a detailed description will be omitted.

Optionally, unlike the instant embodiment where the host computer judges whether the PIN is correct and whether the withdrawal amount is within the allowable limit, the controller 8 may obtain such information from a ledger file administered by the host computer and judges these matters.

Figure 9:
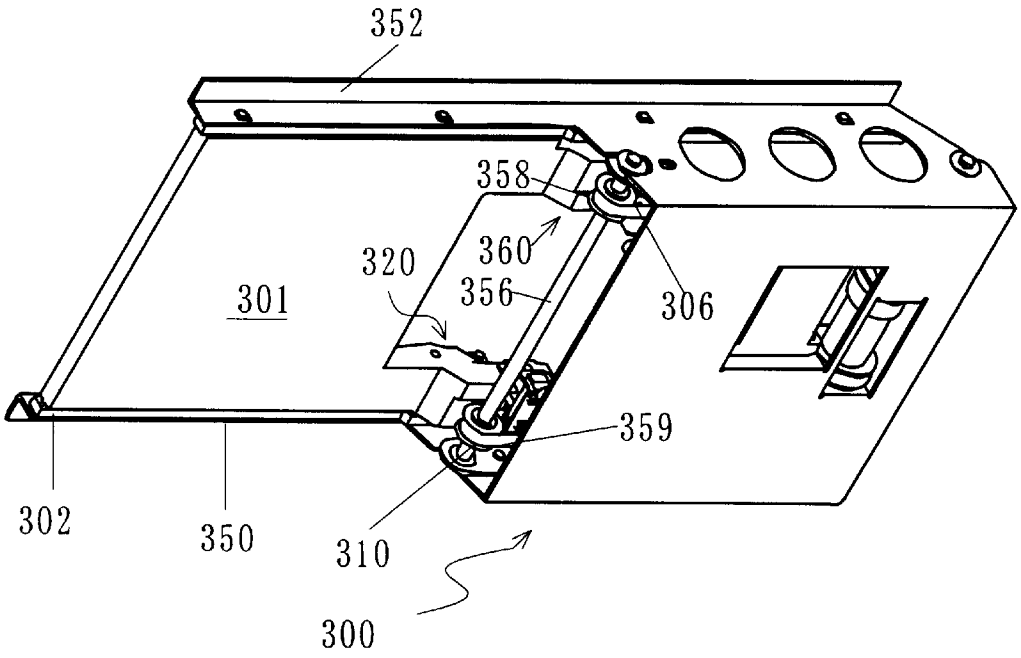
FIG. 9 is a perspective view of a concrete structure of the shutter device according to the present invention.
Figure 10:
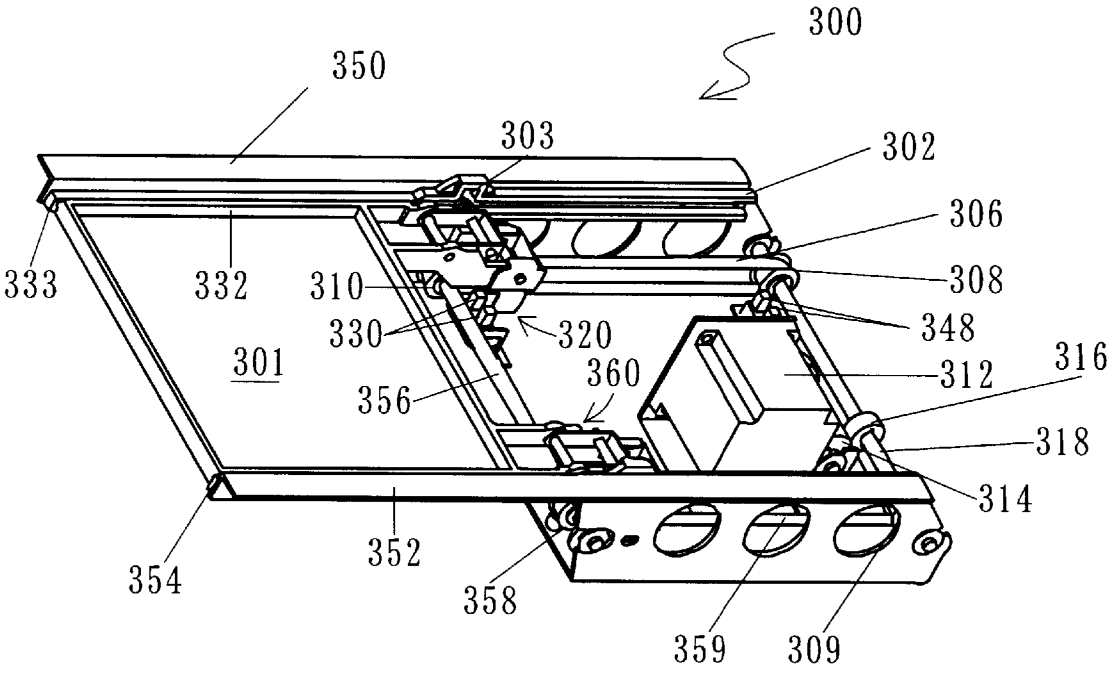
FIG. 10 is a perspective view of the shutter device shown in FIG. 9 viewed from a top.
Figure 11:
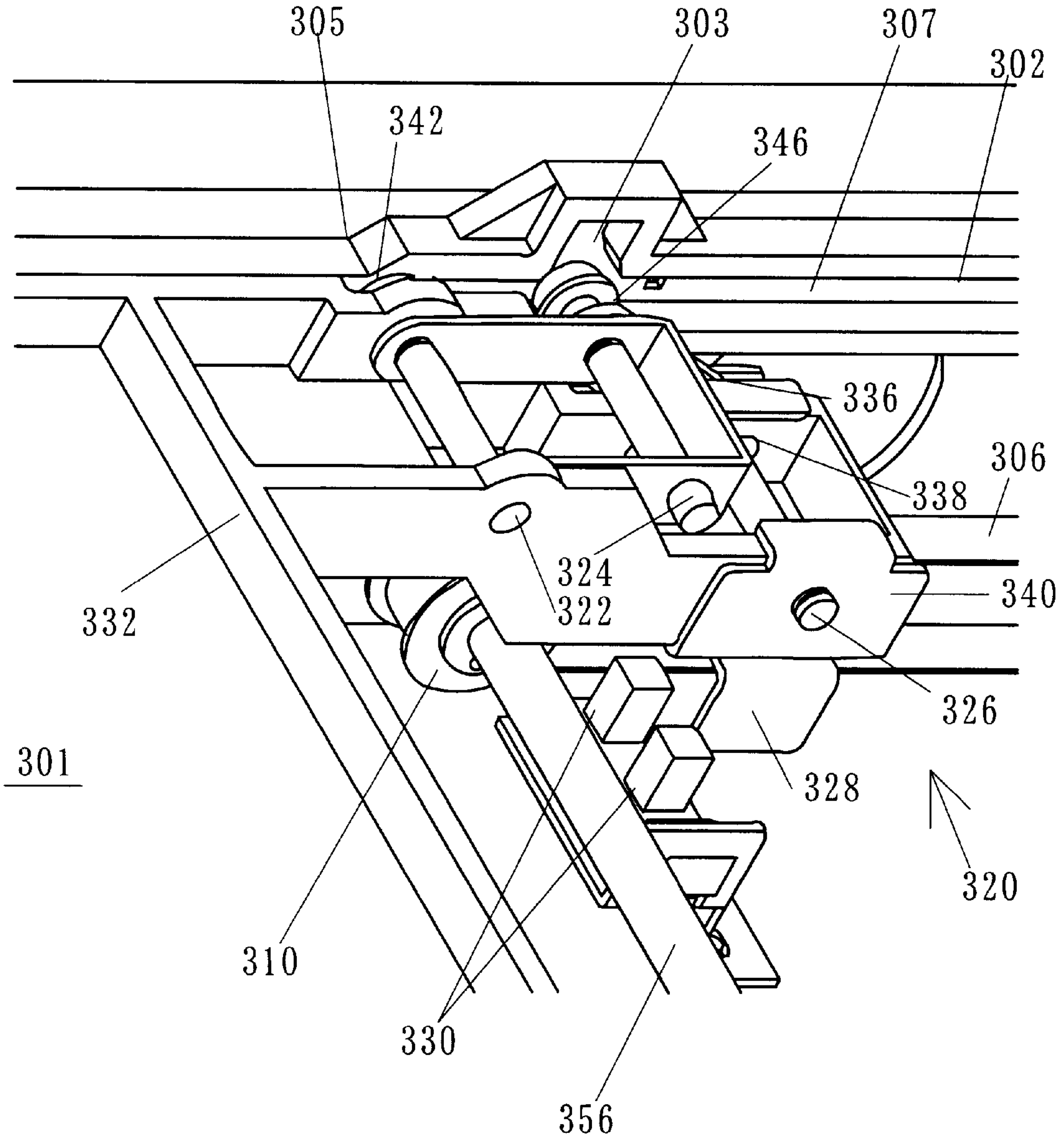
FIG. 11 is an enlarged view of a linkage shown in FIG. 10.

Referring to FIGS. 9–11, a description will now be given of a concrete structure of the shutter device of the present invention. FIG. 9 is a lower perspective view of shutter device 300 of the present invention. FIG. 10 is an upper perspective view of the shutter device 300 of the present invention. FIG. 11 is an enlarged view of linkage 320 of the present invention shown in FIG. 10.

The shutter device 300 of this embodiment is used for a shutter which opens and closes a pool part in an ATM housing, and includes shutter 301; a pair of linkages 320, 360; a pair of guide rails 302, 354 which guide the shutter 301 and the linkages 320, 360; a pair of shutter driving belts 306, 359; lock sensor 330; and opening sensor 348.

The shutter device 300 in this embodiment is provided into the external ATM housing (not shown) via external frames 350, 352.

Since the guide rails 302 and 354 and linkages 320, 360 have similar structures and functions, a description will now be given mainly of the guide rail 302 and linkage 320.

The shutter 301 is secured onto shutter frame 332, and movably inserted, via concave part 333, into guide groove 307 in the guide rail 302. It is also movably inserted, via a concave part (not shown), into guide groove in the guide rail 354. The shutter frame 332 is connected to the linkage 320, 360.

The guide rails 302, 354 are also secured onto the external frames 350, 352.

As shown in FIG. 11, the linkage 320 includes operating shaft 322, lock shaft 324, driving shaft 326, and a pair of links 334, 336.

The operating shaft 322 is connected to the shutter frame 332. The operating shaft 322 is connected movably to the guide groove 307 in the guide rail 302 via the roller 342, and movable to stop position 305 in the guide rail 302 in the left direction. When the operating shaft 322 reaches the stop position 305, it is restricted from moving in the left direction, whereby the shutter 301 stops moving.

In this embodiment, the operating shaft 322 is provided approximately level with the shutter 301. The guide rail 302 is connected to both of the shutter 301 and the operating shaft 322, and guides both members at the same time.

The lock shaft 324 is connected to the operating shaft 322 via the link 334. Therefore, the link 334 is attached rotatably around the operating shaft 322. The lock shaft 324 is connected movably to the guide groove 307 in the guide rail 302 via roller 346. The lock shaft 324 is movable toward the retreat groove 303 in the guide rail 302 in the state shown in FIG. 11.

The driving shaft 326 is spaced from the guide rail 302, and secured onto the shutter driving belt 306 via joint 340. Tab 328 is attached at the lower portion of the joint 340, and movable with the driving shaft 326. The driving shaft 326 is inserted into the guide groove 338 in the shutter frame 332, and connected to the shutter frame 332 so that it is movable in right and left directions relative to the shutter frame 332. The driving shaft 326 is also connected to the lock shaft 324 via the link 336.

In the driving system, the motor 312 rotates gear 314 connected to the motor shaft (not shown), and drives the gear 316 geared with it. As a result, shaft 318 attached to the shaft 316 rotates, thereby rotating roller 308 attached to the shaft 318 and roller 310 attached to shaft 356. As rollers 309 and 358 are driven similarly, a description thereof will be omitted. Thereby, the shutter driving belt 306 is driven.

The lock sensor 330 and the opening sensor 348 each include a pair of light emitting element and light receiving element, and detect a position of the driving shaft 326 (or opening and closing states of the shutter) by the tab 328 which intercepts light.

It is assumed that the shutter 301 has not reached the close position shown in FIG. 10 and the shutter driving belt 306 is moving in the left direction in this state. In this state, the roller 346 of the lock shaft 324 is located at the right side of the position in FIG. 11, while inserted into the guide groove 307 in the guide rail 302, restricting the driving shaft 326 from moving to the left end of the guide groove 338 via the link 336. In this state, the driving shaft 326 compresses the lock shaft 324 to the left via the link 336, and this compression force is transmitted to the operating shaft 322 and the shutter frame 332 via the link 334, whereby the shutter 301 moves in the left direction.

FIG. 11 shows a state in which the roller 342 of the operating shaft 322 reaches the stop position 305 of the guide rail 302. In this state, the roller 346 of the lock shaft 324 breaks away from the guide groove 307 of the guide rail 302 at the upper portion thereof, and is positioned under the retreat groove 303. The link 336 is not restricted from moving.

The operating shaft 322 is secured in the left direction. When the driving shaft 326 then moves further to the left, the driving shaft 326 moves in the left direction relative to the shutter frame 332 along the guide groove 338. By this movement, the link 336 moves the lock shaft 324 upwardly and inserts the roller into the retreat groove. The movement of the lock shaft 324 displaces the link 334, and the arrangement between the shutter 301 and the link 320 in the lock state becomes the same as that of the shutter 101 and the link 110 shown in FIG. 2, locking shutter 301 at the close position.

When the driving shaft 326 reaches the left end of the guide groove 338, the tab 328 becomes positioned in the lock sensor 330. Thereby, the lock sensor 330 may detect that the shutter 301 is locked. The lock sensor 330 is connected to a controller (not shown), and may send the detection result to the controller.

It is assumed that the shutter driving belt 306 moves in the right direction in the state where the shutter 301 is locked at the close position. First, the driving shaft 326 moves in the guide groove 338 in the right direction relative to the shutter frame 332. Thereby, the lock shaft 324 is moved downwardly via the link 336, breaking away from the retreat groove 303, and unlocking the shutter 301.

The roller 346 of the lock shaft 324, which has reached the guide groove 307 in the guide rail 302 at the lower portion thereof, restricts the link 336 from moving in the lower direction. Thus, the driving shaft 326 cannot move further in the right direction in the guide groove 338.

Thereafter, when the driving shaft 326 moves further to the right, the driving shaft 326 moves the lock shaft 324 in the right direction via the link 336. As a result, it moves the operating shaft 322 and the shutter frame 332 in the right direction via the link 334. Thereby, the shutter 301 opens. When the shutter 301 reaches the open position, the tab 328 is positioned in the opening sensor 348. Thereby, the opening sensor 348 may detect that the shutter 301 has opened. The opening sensor 348 is connected to the controller (not shown), and sends the detection result to the controller.

Despite the preferred embodiments thus described, the present invention is not limited to these embodiments, and various variations and modifications may be made without departing from the scope of the present invention.

For example, the present invention is applicable to automatic transaction systems other than ATMs and CDs.

In addition, the present invention is broadly applicable to any processor which includes a working member which is movable among at least two or more positions and is to be locked at least one position. The processor conducts a predetermined process after the working member is locked. In this case, the process is relevant directly or indirectly to the working member. For example, when the working member moves between first and second positions, the working member is made to be locked at each position, and the processor and/or the working member conduct a first process at the first position and a second process at the second position. In this case, a number of processors corresponding to the number of processes may be provided.

Thus, the shutter device of the present invention simplifies the mechanism and reduces the number of components in comparison with the conventional shutter device.

The present invention provides an inexpensive and power-conserving shutter device which requires a small installation space. In addition, the shutter device of the present invention, when applied to an automatic transaction apparatus which should meet strict security requirements, realizes cost saving and miniaturization.

The withdrawal method of the present invention provides a simpler withdrawal procedure than the conventional method.

The present invention also provides a miniature, inexpensive, power-saving processing system that is moved and locked by a linkage.

What is claimed is:

1. A shutter device comprising:

a shutter;

a driving device; and an opening and/or closing device, connected to said shutter and said driving device, which moves said shutter between open and close positions while being driven by said driving device, and locks and unlocks said shutter at the close position while being driven by said driving device.

2. A shutter device according to claim 1, wherein said opening and/or closing device continuously conducts moving of said shutter from the open position to the close position and locking of said shutter at the close position after the moving of said shutter, while said driving device is driven in a first direction; and wherein said opening and/or closing device may continuously conduct unlocking of said shutter at the close position and moving of said shutter from the close position to the open position after the unlocking of said shutter, while said driving device is driven in a second direction.

3. A shutter device according to claim 1, wherein said opening and/or closing device includes an operating member which moves together with said shutter, and starts locking, while being driven by said driving device, said shutter when reaching a position corresponding to the close position of said shutter.

4. A shutter device according to claim 3, further comprising a detecting device which detects that said shutter is locked at the close position by detecting a state of said opening and/or closing device.

5. A shutter device comprising:

a shutter;

a guide rail arranged to be fixed relative to said shutter;

a linkage connected to said shutter and said guide rail; and a driving device connected to said linkage, said linkage moving said shutter between open and close positions while being driven by said driving device and guided by said guide rail, and said linkage locking and unlocking, while cooperating with said guide rail, said shutter at the close position when said shutter is located at the close position.

6. A shutter device according to claim 5, wherein said guide rail is connected to said shutter and guides said shutter and said linkage together.

7. A shutter device according to claim 5, wherein said linkage includes:

an operating member, connected to said shutter and said guide rail, which moves said shutter while guided by said guide rail;

a driving member connected to said driving device and driven by said driving device while spaced from said guide rail; and a link connecting said operating member and said driving member to each other, said driving member driving said operating member via said link and moving said shutter before said shutter is locked, and said driving member cooperating with said operating member and displacing said link so as to lock said shutter when said shutter is located at the close position.

8. A shutter device according to claim 5, wherein said linkage includes:

an operating member, connected to said shutter and said guide rail, which moves said shutter while guided by said guide rail;

a lock member connected to said guide rail and said operating member, and engageable with said guide rail; and a driving member connected to said driving device, wherein said linkage continuously conducts moving of said shutter from the open position to the close position by using said driving member via said operating member, and locking of said shutter at the close position after the moving by engaging said lock member with said guide rail, while said driving device is driven in a first direction, and wherein said linkage continuously conducts unlocking of said shutter at the close position by releasing the engagement of said lock member from said guide ail, and moving of said shutter from the close position to the open position after the unlocking, by using said driving member via said operating member, while said driving device is driven in a second direction.

9. A shutter device comprising:

a shutter;

a driving device;

a driving member driven by said driving device; and an operating member connected to said shutter and said driving member, wherein said operating member moves, while being driven by said driving member, said shutter between open and close positions before said shutter is locked, and wherein said operating member restricts said shutter from moving further in a closing direction when said shutter is located at the close position, and locks and unlocks said shutter at the close position by cooperating with said driving member.

10. A shutter device according to claim 9, wherein said operating member and said driving member relatively approach each other in attempting to lock said shutter, and relatively separate from each other in unlocking said shutter when said shutter is located at the close position, and wherein if an external force is applied to said shutter so as to open said shutter locked at the close position, said operating member acts so that said operating member and said driving member relatively approach each other.

11. A processing system comprising:

a working member;

a processor;

a driving device; and a linkage, connected to said working member and said driving device, which moves said working member between first and second positions while being driven by said driving device, and locks and unlocks said working member at the first position while being driven by said driving device, wherein said processor conducts a predetermined process when said working member is locked at the first position.

12. A processing system according to claim 11, wherein said linkage includes an operating member which moves together with said working member, and starts locking said working member while being driven by said driving device when said operating member reaches a position corresponding to the first position of said working member, wherein said processing system further comprises a detecting device connected to said processor, which detects that said working member is locked at the first position by detecting a state of said linkage, and wherein said processor conducts the predetermined process when said detecting device detects that said working member is locked at the first position.

13. A bill withdrawal method comprising the steps of:

determining a kind and number of bills corresponding to a withdrawal amount in accordance with entry of transaction information;

carrying the bills from a bill storage to a pool part closed by a shutter, and storing the bills in the pool part;

opening the shutter;

confirming that the bills are taken from the pool part; and closing the shutter, wherein said step of opening the shutter includes a step of driving a driving device thereby continuously conducting unlocking of the shutter at a close position and moving of the shutter from the close position to an open position after the unlocking, via a linkage being driven by the driving device, the linkage being able to move the shutter between the open position and the close position, and lock and unlock the shutter at the close position, and wherein said step of closing the shutter includes a step of driving the driving device thereby continuously conducting moving of the shutter from the open position to the close position and locking of the shutter at the close position after the moving, via the linkage.

14. A bill withdrawal method according to claim 13, wherein the driving device is continuously driven in a first direction during said step of closing the shutter, and wherein the driving device is continuously driven in a second direction during said step of opening the shutter.

15. A bill withdrawal method according to claim 13, further comprising, prior to said step of carrying the bills, the step of detecting whether the shutter is locked at the close position, said step of carrying the bills is conducted only when the shutter is detected to be locked at the close position.

* * * * *